Oct. 11, 1932.    G. PIRINOLI    1,882,033

REDUCING GEAR FOR COAXIAL SHAFTS

Filed Sept. 23, 1931

Inventor,
Guglielmo Pirinoli
Atty's By Sommers & Young.

Patented Oct. 11, 1932

1,882,033

UNITED STATES PATENT OFFICE

GUGLIELMO PIRINOLI, OF TURIN, ITALY, ASSIGNOR TO FIAT SOCIETÁ ANONIMA, OF TURIN, ITALY

REDUCING GEAR FOR CO-AXIAL SHAFTS

Application filed September 23, 1931, Serial No. 564,651, and in Italy May 15, 1931.

This invention relates to a reducing gear for co-axial shafts, more particularly for driving aircraft propellers.

The reducing gear consists essentially of two concentrical wheels with an internal and external set of teeth, respectively, keyed on the driving and driven shaft, respectively, and coupled together through an eccentrical rim with external and internal teeth.

In the reducing gears of the type referred to above difficulties are met in providing suitable bearings for the intermediate toothed rim. The object of this invention is to provide efficient means for supporting both the intermediate toothed rim and the internally toothed wheel on both sides so as to obtain a strong and noiseless mechanism.

According to this invention the internally toothed wheel is carried by a box or cage rotating on bearings mounted in the side walls of the box of the reducing gear and the eccentrical toothed rim is rotatably mounted on an eccentric supporting member secured on one side to the box of the reducing gear and pivoted on the other side to the end of one of the shafts of the reducing gear. By this arrangement the load is uniformly distributed on the lateral supports and any bending as might injure the teeth of the gears is avoided.

The accompanying drawing shows by way of example a construction of the reducing gear according to this invention.

Figure 1:
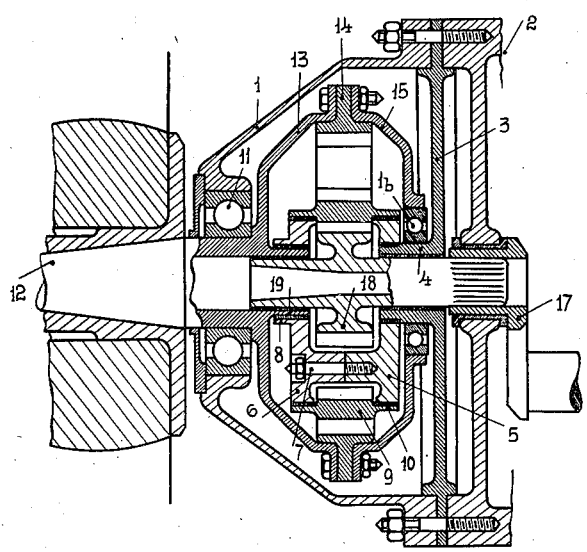
Figure 1 shows the reducing gear in axial section.

The reducing gear is enclosed in an ogival box 1 connected by a flange to the engine casing 2 with the interposition of a diaphragm 3. The diaphragm 3 carries within the box 1 the sleeve 4 on which the eccentric member 5 is screwed or otherwise secured. A corresponding eccentric member 6 provided with a hub 8 is fixed to the former by means of bolts 7. The two members 5—6 thus assembled form a support for the toothed rim 9, eccentric with respect to the engine axis, but centered with respect to said members on which it is rotatably mounted with smooth bearings mounted in the collars 10.

The box 1 supports through a ball bearing 11 the propeller shaft 12 which carries within the box a wide flange 13 to which the internally toothed rim 14 is secured which meshes with the outer set of teeth of the eccentric toothed rim 9.

A flange 15 strengthens and stiffens the system transferring part of the load to the bearings 16. The pinion 18 is inserted between the engine shaft 17 and the driven shaft 12 and is provided with lateral pivots, one of which is keyed in an axial hole of the driving shaft and the other is rotatably mounted in an expansion 19 of the driven shaft on which the sleeve 8 of the member 5—6 is fitted.

Figure 2:
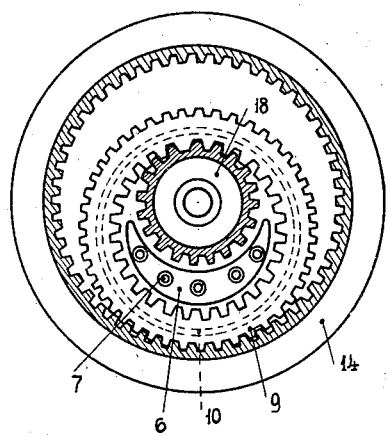
Figure 2 is a cross section thereof.

It will be seen from Figure 2 that motion is transmitted from the pinion 18 to the concentrical toothed rim 14 through the eccentric toothed rim 9; the direction of rotation of both shafts 17 and 12 will be the same and assuming $R_1$ is the number of teeth of the pinion 18, $R_2$ the number of inner teeth of the toothed rim 9, $R_3$ the number of outer teeth of the same toothed rim 9 and $R_4$ the number of teeth of the toothed rim 14, the speed ratio shall be:

$$\frac{R_2}{R_1} \times \frac{R_4}{R_3}$$

A particular advantage of my arrangement is that the load can be distributed on all the gears on both sides of their axis by virtue of the double eccentric member 5—6 and of the box 13—15 fixed to the driven shaft.

What I claim is:

1. In a reducing gear, the combination with a box, a driven shaft and a driving shaft in alignment with each other and a pinion on the driving shaft, of an internally toothed rim, cup-shaped flanges fixed peripherally on each side of said toothed rim, one of said flanges being keyed on the driven shaft, supports in said box for said flanges, an intermediate eccentric toothed rim with internal and external teeth meshing with said pinion and said first-mentioned rim, respectively, and a support for said eccentric toothed rim fixed to said box on one side and supported by the driven shaft on the other side.

2. In a reducing gear, in combination, a box, a driving shaft and a driven shaft in alignment with each other, a concentrical internally toothed rim keyed on the driven shaft, cup-shaped flanges fixed peripherally to each side of said toothed rim, supports in the box for said flanges, an eccentric rim with internal and external teeth, the external set of teeth of said eccentrical rim meshing with the internal set of teeth of said concentrical toothed rim, a support for said eccentric toothed rim fixed on one side to the box and resting on the other side on the driven shaft and a pinion keyed on the driving shaft lodged in a recess on the support of the eccentrical toothed rim and meshing with the internal set of teeth of said eccentrical toothed rim.

In testimony whereof, I hereunto affix my signature.

GUGLIELMO PIRINOLI.